(12) United States Patent
Berg et al.

(10) Patent No.: US 6,406,549 B1
(45) Date of Patent: Jun. 18, 2002

(54) METHOD AND DEVICE FOR CLEANING SHOES, WHEELS AND ALL TYPES OF ROLLERS

(75) Inventors: Gunther Berg, Neu-Fahrland; Viola Holtkamp, Berlin; Dirk Spaltmann, Wesel, all of (DE)

(73) Assignee: 2R Reha-Technik GmbH, Potsdam (DE)

( * ) Notice: Subject to any disclaimer, the term of this patent is extended or adjusted under 35 U.S.C. 154(b) by 0 days.

(21) Appl. No.: 09/423,490
(22) PCT Filed: May 7, 1998
(86) PCT No.: PCT/DE98/01279
  § 371 (c)(1),
  (2), (4) Date: Aug. 17, 2000
(87) PCT Pub. No.: WO98/49989
  PCT Pub. Date: Nov. 12, 1998

(30) Foreign Application Priority Data

May 7, 1997 (DE) .......................... 197 20 769

(51) Int. Cl.⁷ .................. A47L 23/00; A47L 23/06; B08B 1/00; B08B 1/04; B08B 6/00
(52) U.S. Cl. .................. 134/1; 134/19; 134/6; 15/21.1; 15/36; 15/53.4; 15/97.1; 15/97.2; 15/97.3; 15/302; 15/311
(58) Field of Search .................. 134/6, 19; 15/21.1, 15/36, 53.4, 97.1, 97.2, 97.3, 302, 311

(56) References Cited

U.S. PATENT DOCUMENTS 3,203,020 A * 8/1965 Merkel .......................... 15/36
3,526,015 A * 9/1970 Nappi ............................ 15/36
3,611,472 A * 10/1971 Kayser ........................ 15/302
4,280,244 A * 7/1981 Spirig ........................ 15/97 R
4,951,345 A * 8/1990 Nappi, Sr. .................... 15/302
5,771,528 A * 6/1998 Nappi, Sr. .................... 15/311

FOREIGN PATENT DOCUMENTS

| DE | 4447498 | * | 5/1996 |
| FR | 1369197 | * | 12/1964 |
| FR | 1421110 | * | 3/1966 |
| LU | 58697 | * | 8/1969 |
| NL | 50213 | * | 10/1940 |

* cited by examiner

Primary Examiner—Zeinab El-Arini
(74) Attorney, Agent, or Firm—Norris, McLaughlin & Marcus P.A.

(57) ABSTRACT

A method and a device for cleaning the undersurface of footwear and wheels of shopping trolleys and other transport expedients to minimize the amount of dirt and moisture brought into a building by persons entering the building. The objective of the invention is to provide a device which provides sustained high-performance cleaning, even in adverse weather conditions and with heavy use. To this end the invention uses a mat rotated as an endless loop between guide rollers within a floor opening at an entranceway or elsewhere within a building. In a section running in one direction, the mat acts at least partially as a tread surface and absorbs dirt and moisture, while in a section running back in the opposite direction, which has gathered dirt and moisture from its exposure to persons entering the building, the mat is cleaned and reconditioned by mechanical, hydraulic or pneumatic mechanisms within the floor opening. A belt band sliding in guide rails or over a support plate serves to support and convey the mat.

48 Claims, 9 Drawing Sheets

METHOD AND DEVICE FOR CLEANING SHOES, WHEELS AND ALL TYPES OF ROLLERS

BACKGROUND OF THE INVENTION

1. Field of the Invention

The objective of the invention relates to a method and a device for cleaning the undersurface of footwear and the wheels of shopping trolleys, wheelchairs, perambulators and similar items in the entrance areas of frequently used public facilities such as shopping centers, administrative and commercial buildings, healthcare centers or other complexes in public use and with predefined standards of cleanliness.

In supermarkets and stores providing non-prepackaged foods (sausage, meat, dairy products, fruit and vegetables on display), there exist requirements of cleanliness which include the floors. It has to be ensured that no dirt from outside the building reaches displays of non-packaged foods. The greatest source of dirt in this case is from customers entering shopping centers with their trolleys from the parking lot.

The operators of such markets are obliged to install particularly standardized cleaning mats in the area of the entrance. The said mats are supposed to remove and absorb the dirt from footwear and wheels while the customers push their trolleys over them.

Numerous embodiments of mats of this kind are known. They can be manufactured simply and at reasonable cost and obtained in practically any dimensions wanted. The low constructional height of the mats is also advantageous since they can be laid out over large surfaces of even flooring without being perceived as a hindrance by those entering.

In cases of rain and snowfall, however, it is clearly visible that these measures are not adequate to meet the floor cleanliness required. The mats usually installed in the entrances of supermarkets are capable of soaking up about four liters per square meter. The absorption capacity of such mats is already exhausted after 30 minutes if customer traffic is heavy and the weather conditions unfavorable. Subsequently they are no longer a barrier, and dirt and water are borne in and spread around the entire shopping center by the footwear of the public and the wheels of the shopping trolleys.

Although the markets usually make an effort to master the situation by deploying cleaning staff, this is not always possible, depending on the staff available, very cost intensive, and ultimately not effective either.

In addition to the above, the cleaning mats laid out are unattractive from n aesthetic point of view since the impression of a dirty and soaking wet mat has a repellent effect on the public and as a rule displays an undesirable contrast to the other design of the premises.

For the purpose of increasing the absorption capacity of dirt and moisture, cleaning devices with rotating cylindrical brushes or fixed or moveable rows of brushes are known. A supporting structure of parallel rods or belts, into which the upright bristles are clamped or glued, is arranged in a frame structure.

Since devices of this kind have a certain structural height they are usually let into recesses in the floor constructed for this very purpose in the entrance area of the building and wherein the upper edge of the brushes is almost flush with the floor level. The cleaning brushes in such cases may be fixed, free running or driven by a motor.

Since the relatively stiff bristles are also capable of penetrating the footwear sole patterns, they clean more intensively than mats. In addition to the above, the intermeshing of adjacent rows of brushes also introduces a cleaning effect by; stripping off any material adhering to the bristles.

In order to avoid the accumulation of dirt in the underlying recess, dirt and water collecting basins are frequently arranged in the recesses underneath the cleaning brushes.

Because of the self-cleaning effect of the brushes and the uptake capacity of the collecting basin, cleaning devices of this kind clearly have a longer operational period. The dirt collected only needs to be removed after longer time intervals.

2. Description of the Related Art

In order to provide additional support for brush cleaning at the entrance to commercial buildings with a high frequency of visitors and higher cleaning requirements, Patent No. DE 4447498 A1 proposes a footwear sole cleaning device based on rotationally moving belts of brushes wherein the cleaning brushes are automatically cleaned by counter brushes acting on them during operation.

The said facility consists of a large number of motor driven cleaning brushes running parallel to one another transverse to the direction of the people passing through. To achieve the removal of adhering soilage the brush belts are engaged by fixed counter brushes or rotating drums of brushes outside the level walked on.

The measures proposed undoubtedly improve the cleaning effect and prolong the servicing intervals.

A disadvantage of the aforesaid cleaning device in the nomenclature of the independent claim is that they are not suitable for application in sales amenities designed to be visited with a shopping trolley. The reason is that trolleys can only negotiate such devices with difficulty since the mainly small wheels tend to become jammed in the interspaces between the brush carriers.

A device for cleaning wheels is known from Patent No. WO 95/23715. The said device consists of a platform with a trough shaped recess reached via a ramp. A cleaning device consisting of brush segments is arranged at the base of the recess, whereas the sloping sides exhibit pairs of rollers opposite one another., At least one of the rollers is motor driven in order to set the wheels in rotation during the cleaning process.

The remedy proposed above, however, fails to provide any criterion for cleaning the wheels of shopping trolleys, particularly at the entrance to or inside highly frequented commercial buildings, since the device is relatively difficult to negotiate and the actual cleaning process requires the trolley to stand still. In addition to the above, the simultaneous cleaning of footwear is not possible.

The chains of stores are striving for a larger throughput of customers. The aforementioned effective cleaning devices can only be negotiated in a time consuming way however. They limit the throughput of customers and ultimately the turnover.

SUMMARY OF THE INVENTION

The invention was thus based on the objective of setting up a method as well as a device which does not exhibit the aforementioned disadvantages and reveals an efficient cleaning effect of long endurance, particularly at times of unfavorable weather conditions and intensive use.

The objective is achieved according to the invention by a method and device such as classified in independent claims 1 and 12.

Further advantageous developments of the invention are recorded in the subordinate claims.

The advantage of a long sustainable efficient cleaning effect is achieved by the use of a cleaning mat designed as a continuous loop running between at least two guide rollers. The mat serves at least partially as a public access surface in the accessible section, absorbing solid and liquid soilage, the said soilage being subsequently removed again by mechanical, pneumatic, thermal or other suitable treatment in a spatially remote section running in the reverse direction.

A cleaning device with a rotationally moving cleaning mat is let into an opening in the floor of the entrance area of the building in such a way that a public access surface flush with or slightly lower than the surrounding floor results, while the soiled mat is subjected to reconditioning processes within the floor opening in the section running in the reverse direction on the opposite side from the walk-in surface.

The cleaning facilities comprise facilities for removal of the dirt trodden in and such for expulsion of the liquid absorbed.

Mechanical, hydraulic and/or pneumatic mechanisms actuate on the mats for the removal of the dirt and dirty water adhering to the surface. As examples of the former within the meaning of the invention are blades for scraping off dirt or cleaning brushes, the latter are to be understood as belts of brushes sweeping back and forth or rotating cylindrical brushes, beating or vibration equipment, suction nozzles or guide rollers producing meandering or zigzagging motion of the mats. Cleaning with liquids can be carried out by continuous or intermittent spraying of the liquid from nozzles or by contact with a dip bath designed such that at least the pile of the mats is temporarily immersed in the liquid.

Water, which may contain detergents or other additives, serves as the cleaning liquid.

Arrangements of nozzles using compressed air to blow dirt and moisture out of the carpet pile are to be understood as pneumatic actuators. Simultaneous subjection of the path to ultrasound oscillation can further stimulate the process of dirt and moisture deposition.

Any moisture remaining in the mat after completion of the aforementioned reconditioning processes is subsequently expelled thermally by flows of warm air, radiation or the effects of microwaves.

In such applications where preferably dry, fine and non-adhesive dirt particles occur, cleaning of the pile on an electrostatic basis is also possible. The dust particles are drawn out of the mat, electrostatically charged by suitable means, by passage close to a counterelectrode.

In order to increase the absorption capacity of dirt and moisture as well as improving its appearance, the clean dry mat can subsequently be passed through equipment such as a rotating cylindrical brush to re-upright and loosen up the flattened fibers.

To offset the expansion and shrinkage processes which occur during wetting and drying the mat, one or more tensioning rollers can be arranged at a suitable position, for example in the area of the cleaned and dried mat.

In terms of one embodiment of the invention, at least one of the guide or drive rollers in the region below the floor is designed as a tensioning device.

When the public access surface is walked on or otherwise passed over, the whole weight of the visitors and trolleys is transmitted to the cleaning devices via the mat. It thus becomes necessary to support the mat in the region of the public access surface in such a way that it does not sag or become overloaded.

Since the cleaning mat moves with a barely perceptible speed in the majority of applications, it can glide over a supporting plate firmly mounted in a frame or attached to the substructure in the entire area of the public access surface in the simplest case. The forces induced by walking through can then be diverted into the substructure via this platform and the device frame. In order to transfer driving torque to the cleaning mat, the margins of the same are fitted with an additional layer exhibiting profile or perforation features which are coupled via drive elements to at least one of the guide rollers.

An alternative embodiment of such a supporting system preferred according to the invention makes it possible to interconnect the function of supporting the rotationally moving; mat in the area of the public access surface with the function of transporting the said mat in an advantageous manner. According to the invention this is achieved with the aid of a webbed belt conveyer.

A belt conveyer runs between the said guide rollers, The surface of the belt is coated with an anti-slip finish. The belt conveyer and cleaning mat run parallel in the region of the guide rollers and the carrying run. The mat supports itself on the belt as a result of the effects of the tensioning device and those of the loads occurring.

The belt simultaneously transmits its forward drive via the anti-slip coating to the mat and actuates the same.

In a further embodiment of the invention, the transport belt is a link conveyer made up of articulated interlocking flat links.

In yet another embodiment, the belt consists of parallel slats arranged transversely to the transport direction and attached to toothed belts or roller chains.

The circulating belt conveyer loop can either slide fully or in sections on or inside tracks.

In a further development of the invention the belt may be a reinforced elastomeric belt which is either detachably fastened to the cleaning mat using a Velcro closer or non-detachably fastened using adhesive or similar means. Clearing mat and belt conveyer are thus fused together to a functional unit In this integrated structure—hereinafter referred to as the cleaner sliding belt—the belt conveyer takes over the forward drive and tractive forces and the glued on or flocked pile the adsorption of dirt particles and moisture. The adhesive interlayer fixing the pile simultaneously serves to subdue the noise of footsteps and sound emission from the drive and cleaning units in the region below the surface.

At least one of the guide rollers is under drive, preferably in the direction of the loop in front of the public access surface. If the forward drive forces are transmitted via friction, at least the drive roller has to be covered with an anti-slip coating, for example a rubber sheath.

Alternatively of course, the band conveyer can also ran over an additional drive roller or driving pinion located at a suitable position.

Electronic control fitted with internal; and external sensors is used for optimal operation of the cleaning device.

The integrated control equipment has programs for summer and winter operation as well as a clock for busy and less busy times of day.

The internal sensors measure the dirt and moisture contents of the mat leaving the public access surface. Their output signals control the forward drive speed and the intensity of cleaning and drying the mat.

The eternal sensors—positioned outside the building—register the current weather conditions by measuring the humidity, the degree of precipitation and the temperature. The output signals are relayed to or override those of the other sensors.

The dirt and dirty water occurring in the cleaning device can either be accumulated in the collecting basins or discharged through an outlet in the floor.

If collecting basins are used, the same can be equipped with level indicators to inform the staff about the state of the cleaning device and if necessary warn them that an emptying process is due.

The pedestrian safety of the joint between the cleaning device let into the floor and the surrounding floor itself is ensured by edging strips. At the same time, the strips on the long edges serves to hold the mat edges in place on the transport belt in addition to guiding the trolley wheels.

Cap profiles which can be trodden on overlap the guiding mechanisms of the mat at the long edges opposite each other or are flush mounted adjoining them. To ensure unproblematic passage on and off they are beveled off towards the mat in the first case. The aforementioned cap profiles on the long and short sides are hinged to or can be dismounted from the frame structure and serve as at least part of the removable covers for maintenance work.

The entire cleaning device is integrated in a frame structure and is let into and fixed in a properly prepare,d and dimensioned opening in the floor as an installation unit in the entrance area of the building. A preferred embodiment concerns the concept of modular construction. The individual components, split up according to their Functions as drive, guide and cleaning units, can be assembled together in any way at all and thus permit adaptation to the requirements of different applications. The said concept leads to universal applicability of the cleaning device in terms of the invention far beyond the range of the sales amenities.

The cleaning device according to the invention possesses a practically unlimited absorption capacity since a freshly cleaned and dried foot mat is repeatedly made available. The saturation with dirt and water occurring in conventional mats does not occur even after prolonged operational periods. For this reason, a good, uniform and long term sustainable cleaning effect is warranted. This service friendly attribute saves the costs of staff kept on standby for cleaning purposes or for replacing the mats laid out.

Due to the at least approximately flush fitting to the surrounding floor, the mat can be very easily overcome by shopping trolleys, perambulators, wheelchairs, buggies etc, and thus presents no limitation to the customer throughput in sales amenities which are strongly frequented and can only be entered with shopping trolleys.

The invention is not, however, restricted to sales amenities. It can also be applied in front of or inside any kind of commercial building or other administrative institutions with considerable Public traffic. Since cleaned mats with brushed up pile are constantly delivered during business hours, they always present an attractive appearance.

With regard to changing in situ conditions of use, the modular type of construction provides a high degree of flexibility by retrofitting work. individual modules can be exchanged or supplemented with little effort.

Together with preventing the input of dirt and moisture, the invention also offers an opportunity for improving the hygiene in premises equipped with it. A further development of the invention is thus in mind wherein the rotationally moving mat is not only constantly freed of adhering dirt and moisture, but can be treated further. Such further treatment may on the one hand consist of enhancing the cleaning effect by spreading a detergent. On the other hand, the mat can be impregnated with a disinfectant liquid after completion of the cleaning phases. The latter makes it possible to reduce the input of germs on the soles of shoes or the wheels of trolleys along with the dirt in medical centers such as hospitals, or in research and manufacturing complexes with strict cleanliness demands.

Antistatic agents can be applied to prevent or remove electrostatic charges, for example in clean rooms for the production of electronic components.

Application of the foregoing agents can be carried out by any of the known methods by rotating brushes or aerosol spray equipment.

Installation of the cleaning device is not restricted to horizontal floors it can also be integrated in a ramp for trolleys and wheelchairs.

Equipping or combining the device with modern measurement, management and control instruments permits a great variety of operational modes.

Thus various modes can be pre-chosen for busy or less busy periods, for summer or winter operation etc.

In addition to the above, internal sensors permit operation dependent on the actual degree of dirt contamination of the cleaning mat, whereas the switching in of external sensors on sudden weather fluctuations (unexpected strong thundery showers or similar) permits immediate reaction prior to overcharging of the mat.

BRIEF DESCRIPTION OF THE DRAWINGS

Further details and advantages of the invention are explained hereinafter as several exemplary embodiments shown with reference to the drawings.

FIG. 6 Shows a sectional view a further embodiment as built in

DETAILED DESCRIPTION OF THE INVENTION

Figure 1:
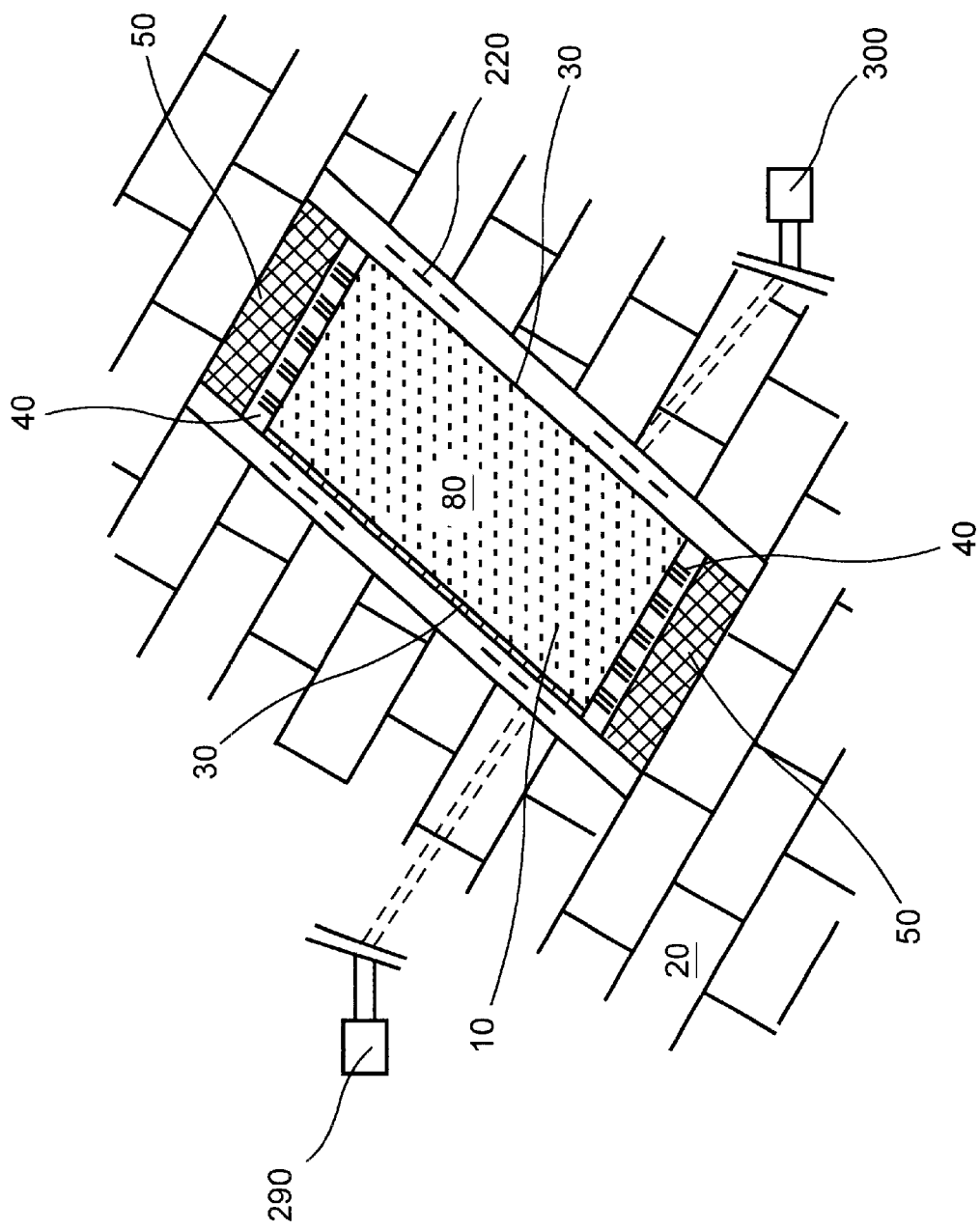
FIG. 1 shows the top view of a cleaning device installed in the entrance area of a building FIG. 2 Shows a sectional view of the device according to the invention as built in FIG. 3 shows a sectional view of a detail of an embodiment of the support and transport system, turned 90° as compared to FIG. 2

A cleaning device in terms of the invention, as shown in FIG. 1, has been let into the. floor of the entrance area of sales amenities and which has to be passed through with shopping trolleys, for example a supermarket. The surface area occupied by a construction unit suitable for a supermarket is approx. 1000 mm×2500 mm, whereof approx. 850 mm×2200 mm are allocated to the visible part of the cleaning mat. Under working conditions, the area of the cleaning mat (10) serving as pedestrian walk-in is up to 10 mm lower than that of the surrounding floor (20). In combination with the round edged guide rails (30) mounted on the sides, this provides guidance for the shopping trolleys. Slightly wedge shaped threshold strips (40) are fitted at the is long ends. The said strips are intended to prevent the intrusion of larger particles and lighten the on and off passage of the trolleys. These bevels are covered with an anti-slip coating (50) to enhance their frictional grip on wet shoes and tires.

Figure 2:
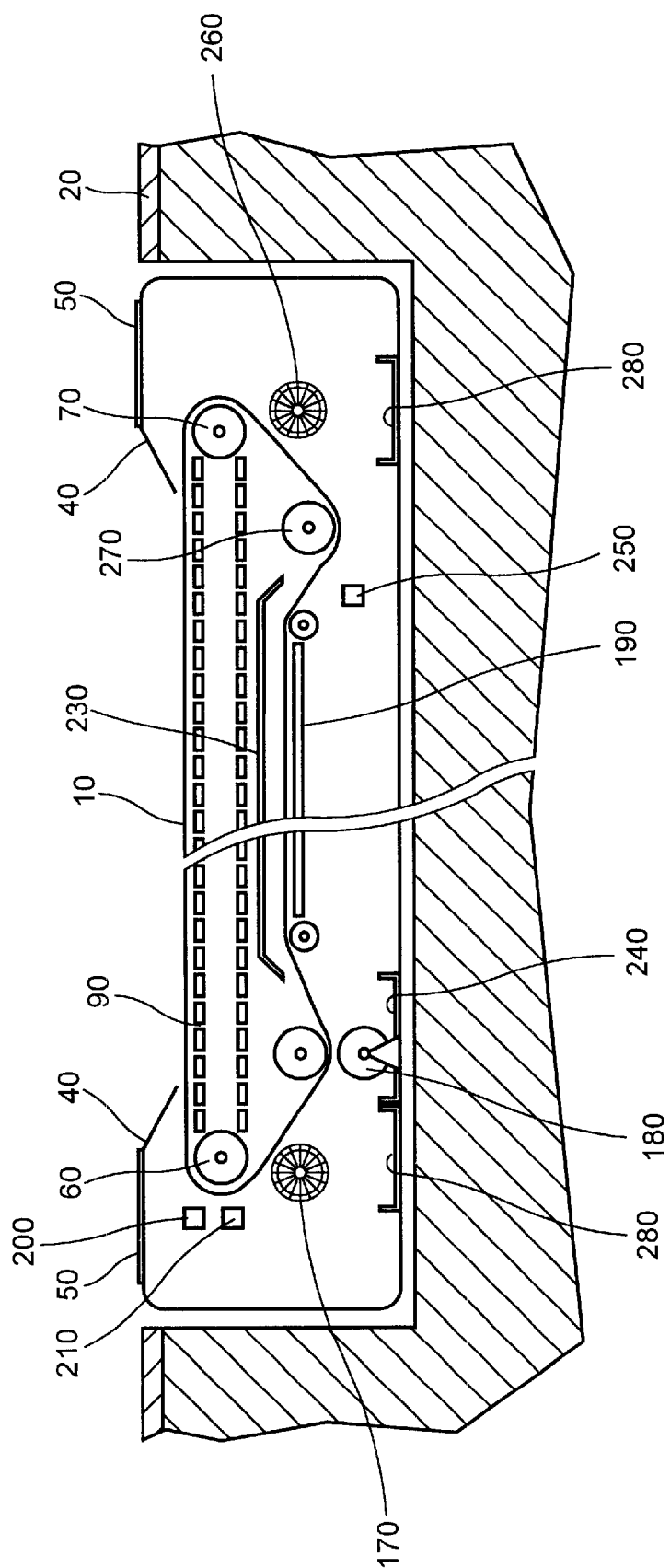

The cleaning mat (10) is laid out as an endless belt rotationally moving at a speed of about two meters per hour under the level of the floor between at least two guide rollers (60) and (70), at least one of which is driven. In order to drive the mat (10) forward and support it at the same time, taking up the weight of the customers and the shopping trolleys in the area of the public access surface (80), the device possesses a support and transport system based on a rotationally moving belt conveyer (90), as shown schematically in FIG. 2.

Figure 3:
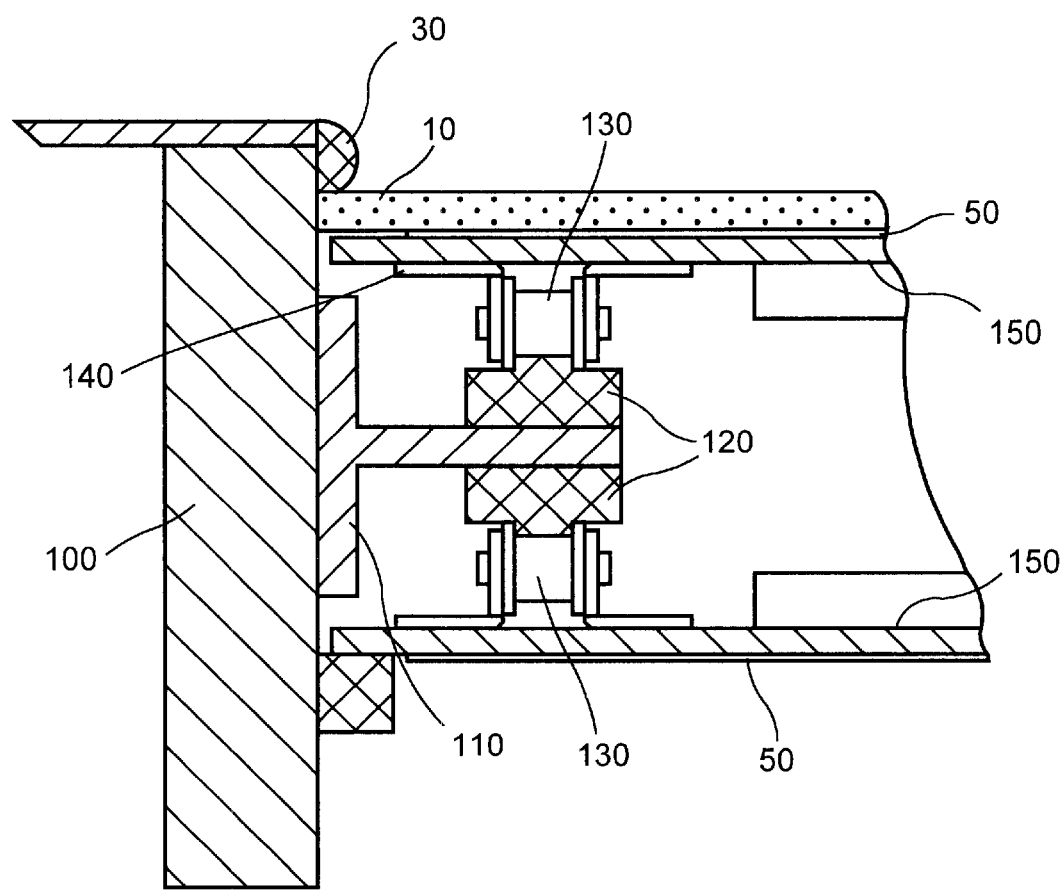

An embodiment with a support and transport system based on a chain roller is recorded in detail in FIG. 3.

A T-shaped or angular support bracket (110) is fixed to each of two metal girders (100) which are firmly attached to the frame structure and either stretch horizontally over the long sides of the frame structure or themselves form an integral part of the frame structure. The said brackets (110) are fixed at the height of the rotational axes of the guide rollers (60) and (70) and their horizontal braces directed inwardly and contrary to each other below the rotating cleaning mat (10). The braces are equipped with tracks (120) for the link belt (90) on their upper and lower sides. The said rails (120) guide the chain links (130). Slats (150), T-profiles for example, are supported by angular supporting elements (140) on the chain links (130). The chain link belt runs between the guide rollers (60) and (70). The guide roller (60) behind the public access surface in the direction of transport is connected with a driving motor via a chain or toothed wheel gear. The endless mat (10) lies on the slats (150) of the belt conveyer (90) in the region of the carrying run. This region serves as the public access surface (80) of the cleaning device according to the invention.

The load introduced by the customers and shopping trolleys moving onto the public access surface (80) is transferred from the mat (10) to the belt (90). The tracks (120) on both sides prevent slack in the chain links (130) by taking up the load and transferring it via the girders into the frame structure.

In order to increase the grip between the slats (150) and the mat (10), the former can be coated with an anti-slip finish (50).

Figure 4:
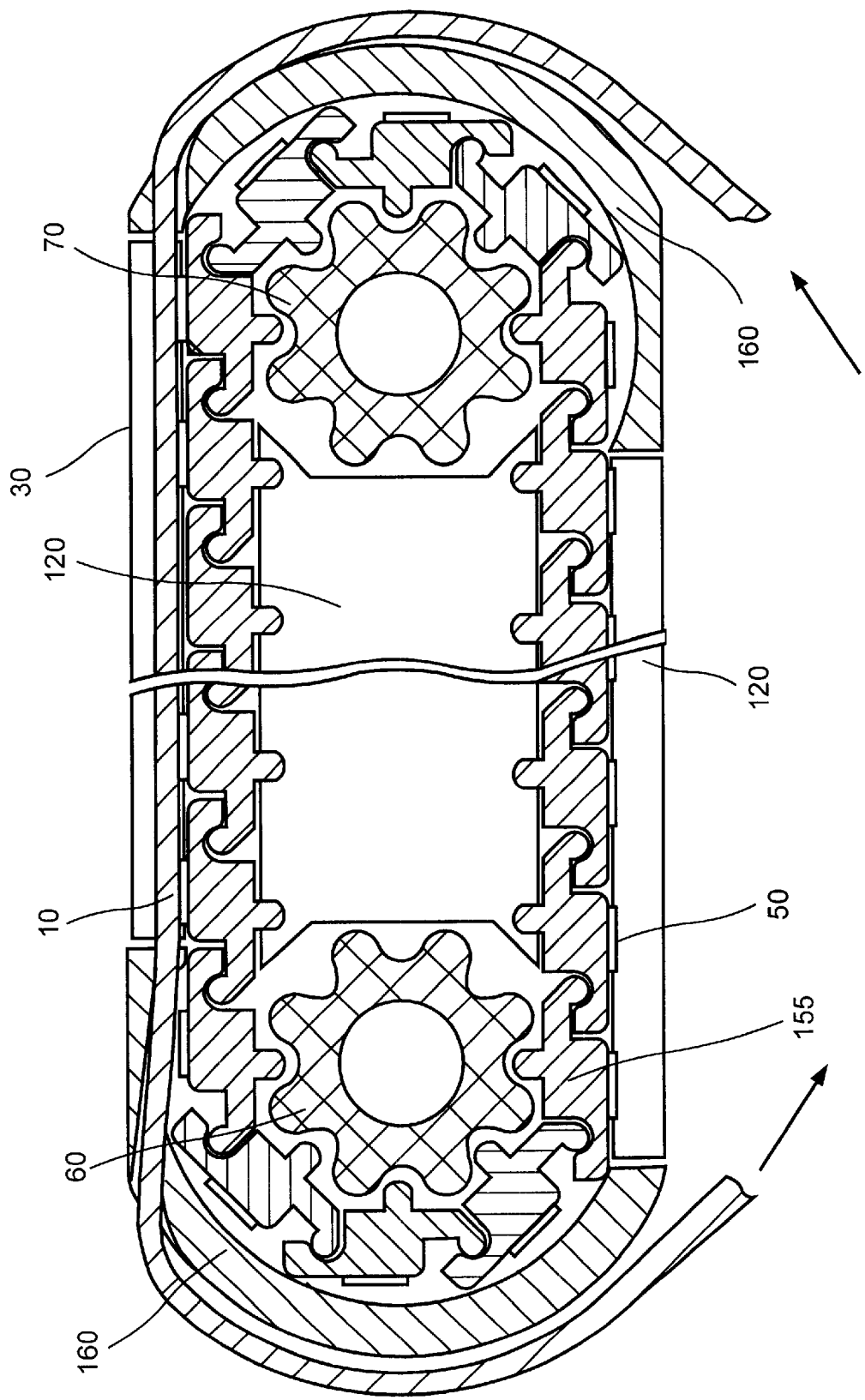
FIG. 4 Shows a sectional view of another embodiment of the support and transport system FIG. 5 Shows a sectional view of a detail of the support and transport system according to FIG. 4, turned 90°
Figure 5:
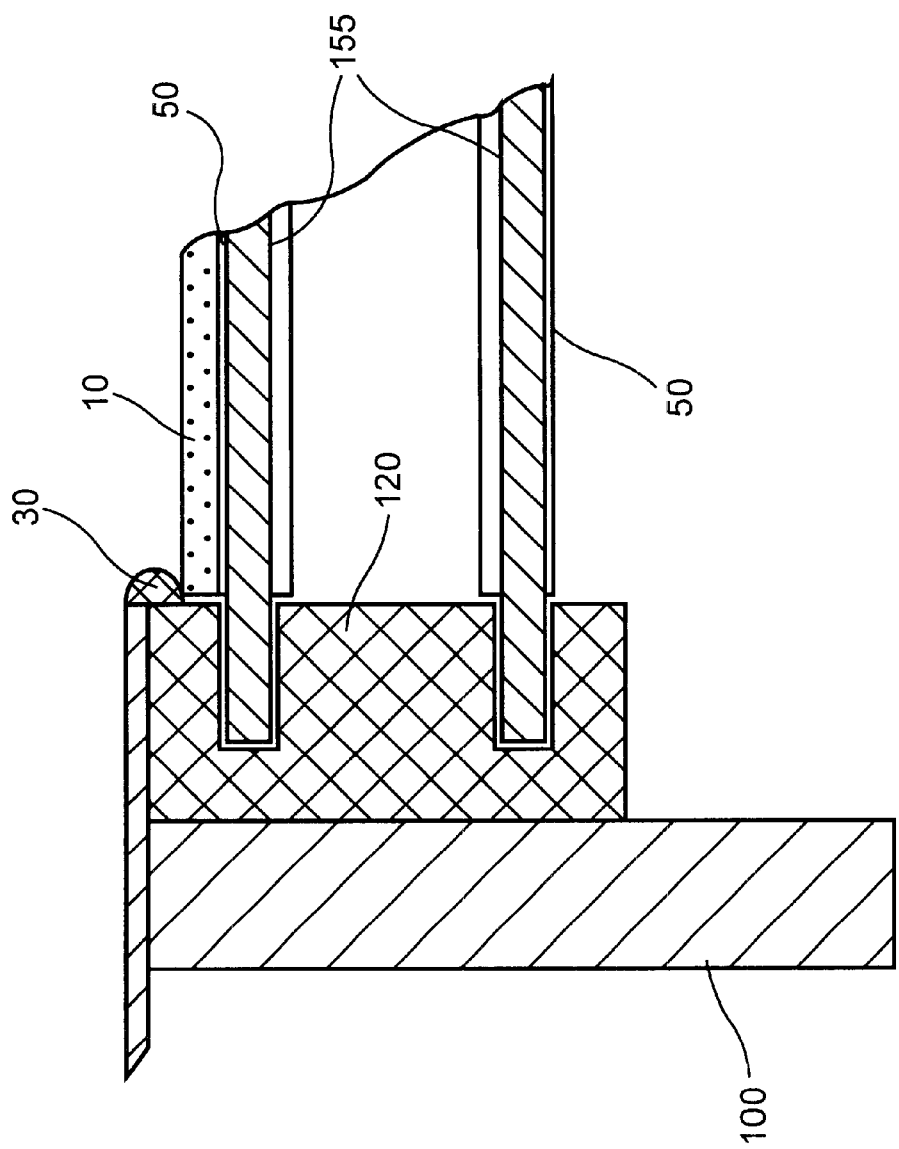

FIGS. 4 and 5 clarify an embodiment of the support and transport system based on the flat link belt conveyor. The link belt conveyor (90) consists of articulated interlocking flat links (155) made of metal, aluminum for example, or any other suitable material, and arranged at right angles to the direction of conveyance.

The belt (90) slides over a supporting plate (370) or tracks on both sides beneath the public access surface at least, in order to take up the forces induced. As already mentioned, this measure prevents a sagging of the public access surface (80) and relieves the load on the guide roller bearings (60), (70).

According to a further proposal of the Invention, the belt (90) is guided in tracks almost uninterruptedly for the entire course of the rotation. For this reason, the side edges of the flat links (155) are restrictedly guided in straight tracks (120) on both sides in the region of the upper and lower carrying runs of the belt, whereas the curved tracks (160) reliably press the belt against the guide rollers (60) and (70) within the active range of the said rollers. Alongside the use of conventional belts—implying those in which the individual links are joined with connecting pins—this embodiment of the invention permits the use of belts wherein the links (155) are loosely interlocked via additional projections and recesses, dispensing with connecting pins, as can be deduced from the schematic representation in FIG. 4. Breaking off or jamming of individual pins is excluded because of the restricted guidance.

The plain outer surface of the flat links also exhibits an anti-slip coating (50) to increase the grip on the mat (10) on top of it. The inner surface opposite is equipped with ridges to enhance the flexural strength. The sleeves of the guide rollers (60) and (70) are also advantageously equipped with a corresponding ridge so that the ridges of the belt links (155) mesh with the grooves of the guide rollers and transmit the driving torque in this way, as can be seen in FIG. 4.

In the embodiments of the invention illustrated in FIGS. 2 to 5, the cleaning mat (10) which has been joined up to an endless loop by means of sewing, hooking, adhesive or zip-fastener techniques is longer that the belt conveyor (90). Belt (90) and mat (10) are separated at guide roller (60) under the influence of the tracks (160) or gravitational forces after leaving the public access surface (80). Detached and at a distance from the belt conveyor (90), the mat (10), then passes through a series of reconditioning stations including a scraper blade and/or a cylindrical brush (170), a calender (180), and a heating phase (190) for cleaning and drying purposes, to be ultimately pressed onto the belt conveyor again on guide roller (70) at the latest.

Dirt and moisture sensors (200) and (210) test the mat (10) leaving the public access surface (80) for the degree of soilage and moisture penetration in the area of the driven guide roller (60). The output signals of the said sensors (200) and (210) control the forward drive speed of the mat (10) and the intensity of the cleaning and drying process. The greater the soilage detected, the higher the forward drive speed and the more intensive the cleaning process. The faster the forward drive speed, the quicker the subsequent delivery of clean and dry matting.

Following the sensors (200) and (210), the mat (10) passes through a dirt stripping unit with a scraper blade and/or a cylindrical brush (170) which mechanically remove the adhering dirt in the first reconditioning phase.

The rotational movement of the cylindrical brush is implemented by a separate, preferably electrical drive unit. Alternatively, acting in conjunction with a cylinder in contact with the mat (10) or belt (90), it can also be generated from the forward drive of the same.

In a subsequent reconditioning phase, the dirty water borne along on the surface and in the pores is expelled. The mat (10) is squeezed out in the roll slit of a calender (180).

Any residual moisture is driven out in a subsequent heating phase (190). A hot air blower or a heat radiator serve as the source of heating energy. In the former case the warm humid air is released into the environment via ventilation slits (220). In the latter case it has proved advantageous to recover the moisture released via a condenser unit (230) and feed it into a receiver vessel (240). A thermal sensor (250) controls the temperature in this region.

In order to increase its capacity in taking up dirt and water as well as improving its appearance, the cleaning mat (10) can be brought into contact with a rotating cylindrical brush (260) which re-uprights and loosens up flattened fibers prior to reappearance on the public access surface.

A tensioning roller (270) is positioned at a suitable place, preferably between the reconditioning units and the guide roller (70). The tensioning system ensures that the mat (10) remains taut on the transport belt at the guide rollers (60) and (70) and in the region of the public access surface (80) and that it passes through all reconditioning stations reliably.

Dirt and water can possibly be collected in vessels (240) and (280). Alternatively, a floor outlet can drain off dirt and water.

Figure 6:
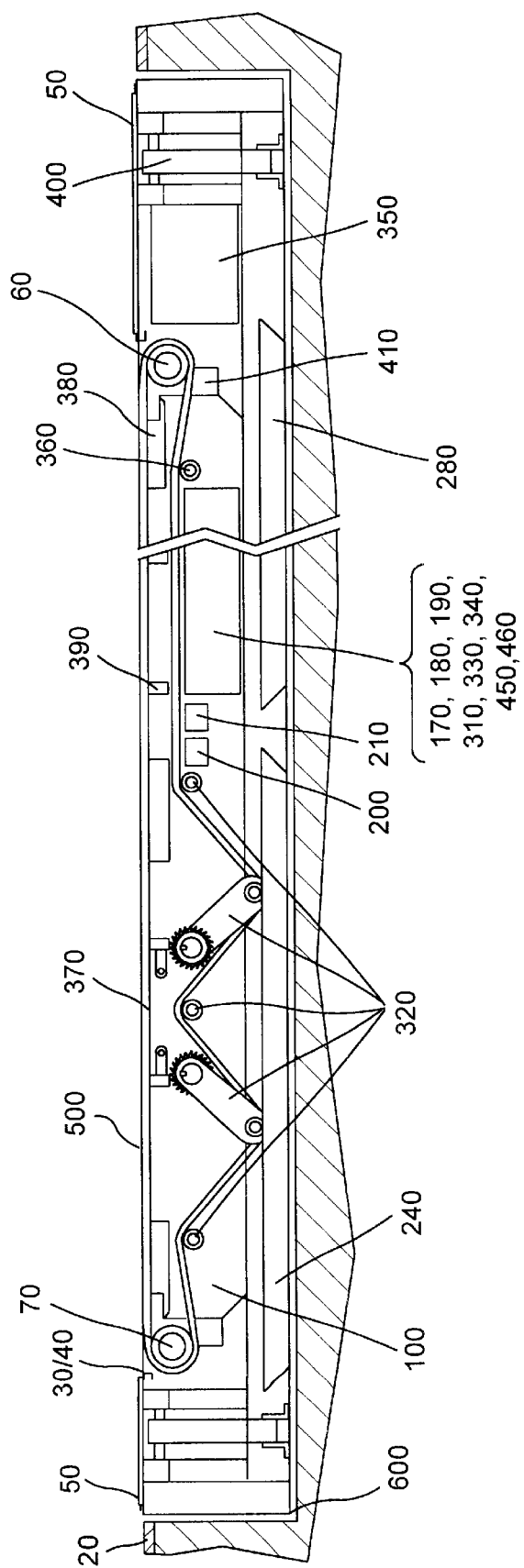
Figure 8:
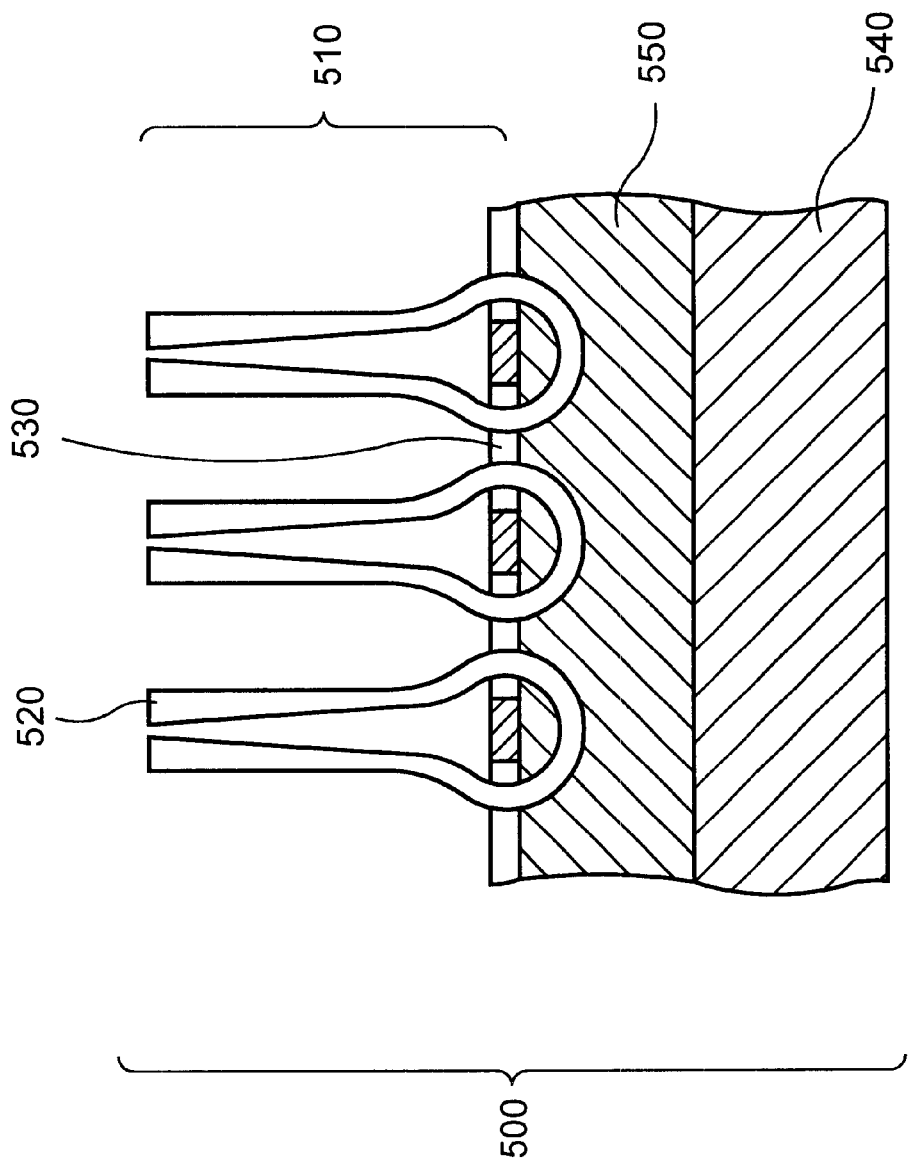
FIG. 8 shows a detailed view of a preferred embodiment of the cleaner sliding belt

In a further embodiment of the invention illustrated in FIG. 6, the functional separation of belt conveyer (90) and cleaning mat (10) is dispensed with on the whole. In this embodiment, a firm interconnection between the cleaning mat (10) and support/transport belt conveyer (90) takes the place of the contact between the rotating cleaning mat (10) and the belt conveyer (90), essentially restricted to the public access surface (80) and the region of the guide rollers (60) and (70) and which otherwise pass through the underfloor region separately. The mat (10) and belt (90) are detachably, or as sketched in FIG. 8, non-detachably interconnected. A detachable interconnection, meaning sewn, Velcro or hook and eye connections, simplifies the replacement of a worn out cleaning mat while maintaining the less strained belt conveyer. A non-detachable interconnection, such as a welded or adhesive connection, fuses the mat (10) and the belt (90) to a single unit which combines the function of a dirt and moisture adsorption system with that of a support and transport system. such a cleaning sliding belt conveyer (500) consisting of a composite of three components is recorded in detail in FIG. 8. It comprises a pile layer (510), a carrier material (540), and an intermediate adhesive layer (559). The pile (510) consists of a meshed textile (530) which accommodates resistant bristles (520). The carrier material (540) transmits the driving torque and cakes up the tensile loads. The mesh textile (530) and bristles (520) are anchored in the adhesive layer (550). The said composite is elastic and sufficiently flexible to cushion the impact of footsteps and:: compensate the alternating pressure and tensile stress on the guide rollers (60) and (70). In addition to the above, it deadens the sound emitted from the reconditioning stations. Flame retardants or any other additives influencing the characteristics of the belt in a desirable way are incorporated in the adhesive layer (550). The belt (500) slides over a support plate (370) in the region of the public access surface (80) which itself rests on the transverse girders (380) and struts (390). The forces induced! on the public access surface (80) when persons or transport expedients pass through are dispersed in the device frame via the support plate (370) and the said transverse girders (380) and struts (390). To avoid unnecessary frictional losses, at least the region of the support plate (370) in contact with the belt exhibits as low a coefficient of friction as possible. The aforementioned can in fact be achieved by commonly known corresponding surface treatment the said treatment covers friction reducing surface coatings as well as functional structuring of the plate surface, particularly honeycomb-type arched structures. The latter increases the sectional modulus against deflection at the same time.

The cleaner sliding belt (500) laden with dirt and/or moisture leaves the public access surface (80) over the guide roller (70) and initially passes through a system of fixed and slack bearing cylinders (320). The cylinders (320) are so arranged that the belt moving through (500) is subjected to multiple re-routing. The alternating compression and stretching of the basis of the mat, the spreading and pressing together of the mat's pile (510) produce a mechanical cleaning effect. Moisture is wrung out, dirt particles lose their support or are rubbed off by the mutual interaction of the bristles (520) and dry or dried up dirt incrustations are torn apart by multiple deformation and fall off.

One or more of the cylinders (320) are on slack bearings. Actuated by a spring, which may also be a gas pressure spring, they are resiliently pressed against the material (500) passing through and tension it in order to compensate changes in length resulting from temperature and moisture fluctuations. If required they also have a dampening effect on load thrusts in the drive system. The moisture and dirt sensors (200) and (210) following the cylinder segment (320) test the soilage and penetration of moisture in the material prior to entry into the other reconditioning stations (170), (180), (190), (310), (330), (340), (450) and/or (460). The output signals of the said sensors regulate the intensity of the subsequent reconditioning and the forward drive speed of the material, as already mentioned elsewhere. The mat (500) passes through a suction unit (310) in its first reconditioning phase. Dirt and moisture are sucked out of the carpet by an array of nozzles close to the entire width of the material and which can act in conjunction with a brushing/beating unit (330) or ultrasound treatment. In the subsequent thermal reconditioning phase, a magnetron acting on the damp cleaner sliding belt (500) with microwaves can be arranged as an alternative to the conventional heating unit. Water, with a high dielectric constant, absorbs the impinging radiation and evaporates. Suitable screening prevents any unwanted emission of radiation. The public access surface (80) and, threshold strips (30) and (40) are level with the surrounding floor according to the embodiment illustrated in FIG. 6. They terminate flush with the carpet material, under the influence of an elastic lip if required. The threshold strips (30) and (40) are parts of the capping. The said strips can be removed or opened up on hinges attached to the casing for servicing or repair purposes, in which case a gas pressure spring or a spindle motor may assist the opening.

Figure 7:
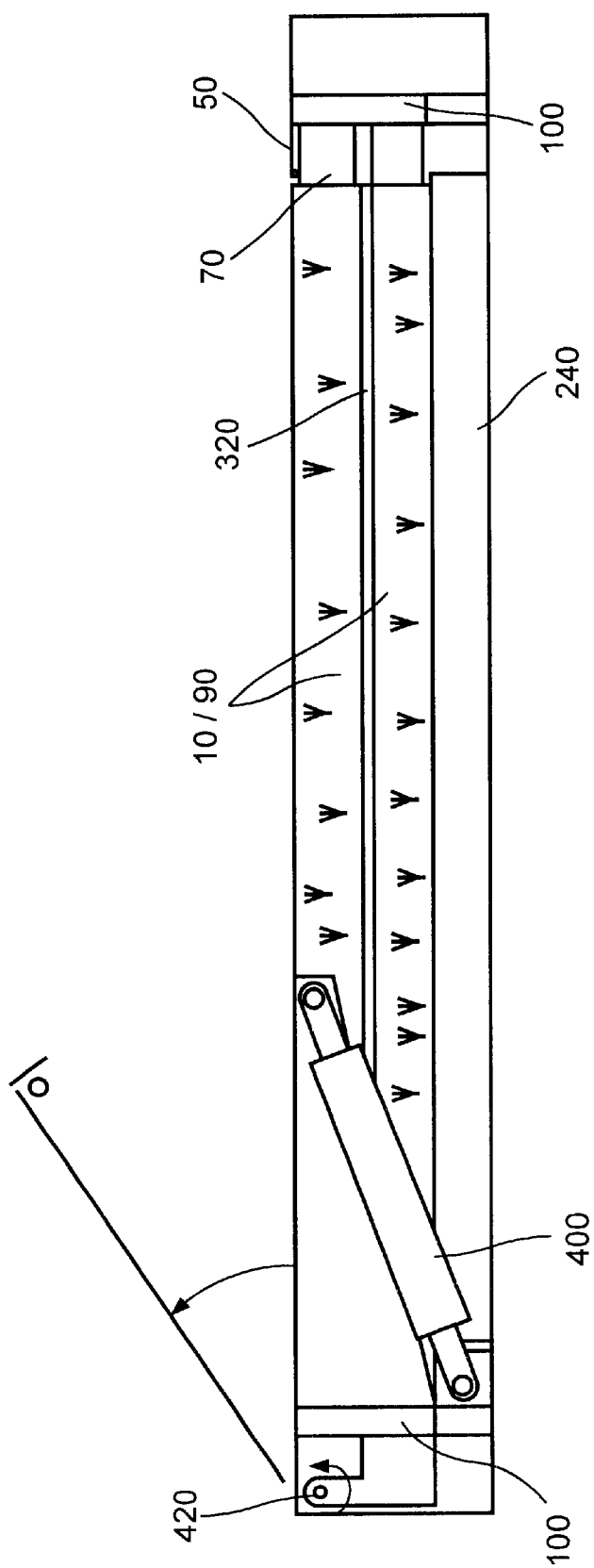
FIG. 7 shows an embodiment according to FIG. 6, turned 90°

The embodiment shown in FIG. 7 is distinguished in that the entire cleaning device can be opened up on hinges from the floor opening. The supporting frame is on swivel bearings (420), making it possible to open up the entire cleaning device for emptying the collection basins (240) and (280) or for servicing or repair purposes. All the device components are readily accessible in this way. Again, gas pressure springs (400) or a spindle motor may assist the lifting process.

Figure 9:
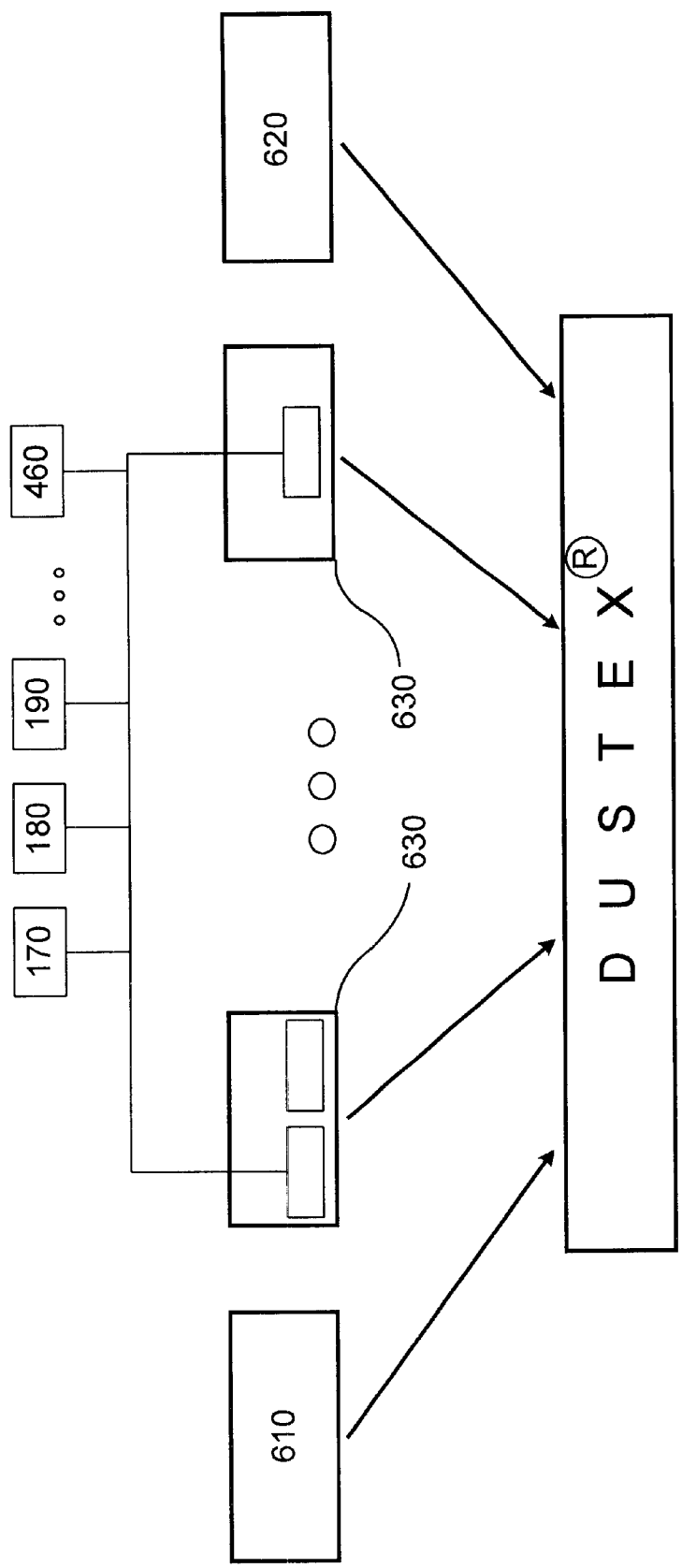
FIG. 9 shows a principle representation of the modular type of construction of the cleaning device according to the invention

The concept of the most favored modular type of construction according to the invention is represented in FIG. 9. The entire device is put together like a construction kit from three essentially different functional components—a drive module, a routing module, and one or more cleaning modules.

The drive module covers the drive roller (60) as well as the drive aggregate including its control unit (350). The routing module consists essentially of the guide roller (70) and the tensioning unit (320).

The cleaning module (630) is comprised of the reconditioning stations (170, 180, 190, 310, 330, 340, 450, 460) for removal of the accumulated dirt and expulsion of the liquid taken up. In this process, modules with only a single cleaning unit are on standby as well as those realistically combining two or more reconditioning steps, for example beating and suction, brushing and suction, or drying and re-uprighting or loosening up the pile respectively. Each module (610, 620, 630) is a self-contained unit equipped with its own supply connections for the integrated reconditioning units.

The said module naturally also has all the elements of the support construction (girders, struts, support plate etc.) at its disposal. Depending on the requirements of the particular application, suitable modules are put together in the cleaning device with the aid of commonly known coupling techniques. The interconnection of a drive (620) and a routing module (610) can be the smallest embodiment.

As a general rule, however, one or more modules (630) with reconditioning stations (170, 180, 190, 310, 330, 340, 450, 460) are inserted between modules (610) and (620). The broad spectrum of variations of combinable components as well as the possibility of subsequent exchange or supplementation are the basis of the high degree of variability and breadth of applications of the device according to the invention. An external moisture sensor (290) is connected to the cleaning device. This is located outside the building and reports a shower for example directly to the control unit.

The condition of the device can be read off from a display and operational control element (300).

The relevant opening times of the supermarkets can be fed into this unit (300), by means of which the device is automatically switched on or off respectively.

The operational control element (300) can be installed permanently at the information desk of the supermarket for example. It can however be of portable design. after programming or reading off the condition, the operational element is separated from the cleaning device and kept in a safe place.

A radio link is also conceivable.

What is claimed is:

1. A method for cleaning an undersurface of footwear, wheels of shopping trolleys, wheelchairs, perambulators, or other transport expedients, at an entrance area or inside a building, comprising the steps of:
    rotating either continuously or intermittently within a top portion of a floor opening of said building, a mat comprising a lower carrying run and an upper carrying run, a region of which is exposed to said footwear or said transport expedients to define a public access surface, wherein said mat is configured as an endless loop for absorption of dirt and moisture;
    removing said absorbed dirt within a bottom portion of said floor opening; and
    heating said mat with microwaves within said bottom portion of said floor opening to remove said absorbed moisture.

2. The method according to claim 1, further comprising the step of reconditioning said portion of said mat defining said public access surface to remove said absorbed dirt and expel said absorbed moisture.

3. The method according to claim 2, wherein said mat is impregnated with additional agents during or after the said reconditioning step.

4. The method according to claim 1, wherein said mat in operation is connected to a rotating belt conveyer at least in the area of said mat serving as said public access surface.

5. The method according to claim 4, wherein said mat and said belt conveyer are frictionally interconnected.

6. The method according to claim 4, wherein said mat and said belt conveyer form a composite.

7. The method according to claim 1, wherein internal sensors determine a degree of soilage and moisture penetration of said mat and output signals from said sensors regulate a speed at which said mat is rotated.

8. The method according to claim 7, wherein said output signals from said sensors regulate a speed at which said mat is rotated and said dirt is removed from said mat by either a cylindrical brush having a rotational speed regulated by said output signals or by a suction nozzle having a throughput regulated by said output signals.

9. The method according to claim 7, wherein external sensors measure weather parameters and generate output signals which are relayed to said internal sensors.

10. The method according to claim 1, further comprising a heating step wherein one or more sensors determine an amount of moisture penetration of said mat and output signals from said sensors regulate a speed at which said mat is rotated and a temperature at which said mat Is heated by means of a heating unit.

11. The method according to claim 1, wherein said mat is rotated at a speed of between 1 m/h and 5000 m/h.

12. A device located within a floor opening, having a bottom surface, at an entrance area or inside of a building for cleaning an undersurface of footwear, wheels of shopping trolleys, wheelchairs, perambulators or other transport expedients, comprising:
    at least two guide rollers located beneath said floor wherein at least one of said guide rollers is driven by a motor;
    a mat comprising a lower carrying run and an upper carrying run, a region of which is exposed to said footwear or said transport expedients so as to define a public access surface for absorption of dirt and moisture from said footwear and wheels, wherein said mat is designed as an endless mat and rotates in a transport direction between said at least two guide rollers; and
    at least one reconditioning station comprising a heating unit which emits microwaves for removing said absorbed moisture from said mat.

13. The device according to claim 12, further comprising a belt conveyor between said guide rollers, wherein said mat is supported on said belt conveyor at least in the area of said public access surface.

14. The device according to claim 13 further comprising a supporting plate, wherein said belt conveyor supporting said mat in at least the area of said public access surface slides over a region of said supporting plate.

15. The device according to claim 14, wherein said region of said supporting plate in contact with said belt conveyer comprises an arched surface structure for reducing friction and enhancing flexural strength.

16. The device according to claim 13 further comprising a pair of braces equipped with tracks for said belt conveyor, wherein said public access surface supported by said belt conveyor slides over or inside said tracks.

17. The device according to claim 16, wherein said belt conveyor is a chain link belt to which slats oriented transverse to said transport direction of said mat are attached, and wherein said chain link belt slides over said tracks in the area of said upper carrying run.

18. The device according to claim 17, wherein a surface of said slats is coated with an anti-slip finish.

19. The device according to claim 13, wherein said belt conveyor is a link belt made up of articulated interlocking flat links.

20. The device according to claim 19, wherein said flat links slide in straight tracks in the region of upper and lower carrying runs, and under curved tracks in the region of said guide rollers.

21. The device according to claim 20, wherein said flat links adjacent to one another are interlocked via complementary projections and recesses.

22. The device according to claim 19, wherein said flat links are coated with an anti-slip finish.

23. The device according to claim 13, wherein said belt conveyor is an elastomeric belt reinforced with textile ply.

24. The device according to claim 23, wherein said belt conveyor and said mat are fastened together.

25. The device according to claim 24, wherein said belt conveyor and said mat are detachably fastened together.

26. The device according to claim 24, wherein said belt conveyor and said mat are fastened together as a composite bond.

27. The device according to claim 26, wherein said composite bond comprises a carrier material, a pile layer and an intermediate adhesive layer.

28. The device according to claim 27, wherein said intermediate adhesive layer forms an insulating layer.

29. The device according to claim 12, wherein said at least one guide roller driven by a motor has an anti-slip frictional coating.

30. The device according to claim 12, wherein said reconditioning stations comprise a heating unit and a means for acting directly or indirectly on said mat to clean said mat.

31. The device according to claim 30, wherein said means for acting indirectly on said mat comprise scraper blades, rows of brushes, rotating cylindrical brushes, guide rollers, beating equipment, calendars, suction nozzles, compressed air flows, liquid sprays and dips.

32. The device according to claim 12, wherein said means acting directly on said mat comprises an ultra-sound generator or equipment for generating and subsequently removing electrostatic potentials from said mat.

33. The device according to claim 30, wherein said heating unit is a hot air blower.

34. The device according to claim 30, wherein said heating unit is a heat radiator.

35. The device according to claim 34, further comprising a condenser unit located above said mat.

36. The device according to claim 30, wherein a cylindrical brush to re-upright and loosen up a surface of said mat is arranged subsequent to said at least one reconditioning station.

37. The device according to claim 30, wherein a cylinder or roller on resilient bearings acts as a tensioning device for said mat or a cleaner sliding belt.

38. The device. according to claim 37, wherein the resilience of said bearings is generated or supported by a gas pressure actuated spring.

39. The device according to claim 12, wherein the device is a pre-engineered unit.

40. The device according to claim 39, wherein the device is assembled together from separate modules.

41. The device according to claim 39, or 40, wherein a frame is located in a pivot bearing such that said device can be hinged out of said floor opening.

42. The device according to claim 12 or 39, wherein one or more collecting basins for dirt and dirty water are arranged on said bottom surface of said floor opening.

43. The device according to claim or 39, wherein said bottom surface of said floor opening has a slope with a drainage. outlet at its lowest point.

44. The device according to claim 12, wherein non-slip safety edging strips form a threshold between said public access surface of said mat and said floor opening.

45. The device according to claim 44, wherein said strips oriented parallel to said transport direction act as guide strips.

46. The device according to claim 44, wherein said strips arranged transversely to said transport direction overlap guiding mechanisms and are beveled off towards said public access surface.

47. The device according to claim 44, wherein said strips terminate flush with said mat.

48. The device according to claim 44, wherein said strips are mounted so they can be removed or opened up on hinges.

* * * * *